United States Patent

Romary et al.

[11] Patent Number: 5,852,645
[45] Date of Patent: Dec. 22, 1998

[54] FUEL ASSEMBLY WITH CONSUMABLE POISON, AND A METHOD OF OPERATING A REACTOR

[75] Inventors: Jean-Michel Romary, Lyon; Michel Bonniaud, Decines-Charpieu, both of France

[73] Assignees: Framatome, Courbevoie; Compagnie General des Matieres Nucleaires, Velizy-Villacoublay, both of France

[21] Appl. No.: 860,227
[22] PCT Filed: Dec. 20, 1995
[86] PCT No.: PCT/FR95/01700
   § 371 Date: Jun. 23, 1997
   § 102(e) Date: Jun. 23, 1997
[87] PCT Pub. No.: WO96/20484
   PCT Pub. Date: Jul. 4, 1996

[30] Foreign Application Priority Data

Dec. 23, 1994 [FR] France .................................. 94 15593

[51] Int. Cl.$^6$ ...................................................... G21C 3/326
[52] U.S. Cl. ............................................. 376/419; 376/435
[58] Field of Search ....................................... 376/419, 428, 376/435, 447

[56] References Cited

U.S. PATENT DOCUMENTS

| 4,587,090 | 5/1986 | Mochida et al. | 376/428 |
| 4,649,020 | 3/1987 | Dehon et al. | 376/419 |

FOREIGN PATENT DOCUMENTS

| 0155865 | 9/1985 | European Pat. Off. . |
| 0369305 | 5/1990 | European Pat. Off. . |

OTHER PUBLICATIONS

Kerntechnik, vol. 52, No. 4, Aug. '88, Munchen DE, pp. 245–249, XP002000895 Francillon et al.; "Fuel management at Fragema: experience, assents, perspectives", See page 248.

*Primary Examiner*—Daniel D. Wasil
*Attorney, Agent, or Firm*—Pollock, Vande Sande & Amernick

[57] ABSTRACT

The fuel assembly for a pressurized water reactor comprises rods distributed at the nodes of a square array and containing the fuel material. Some of the rods have a first mass concentration of gadolinium lying in the range 5% to 12%. Four to twelve additional rods (16) contain gadolinium at a concentration lying in the range 0.5% to 2%.

10 Claims, 2 Drawing Sheets

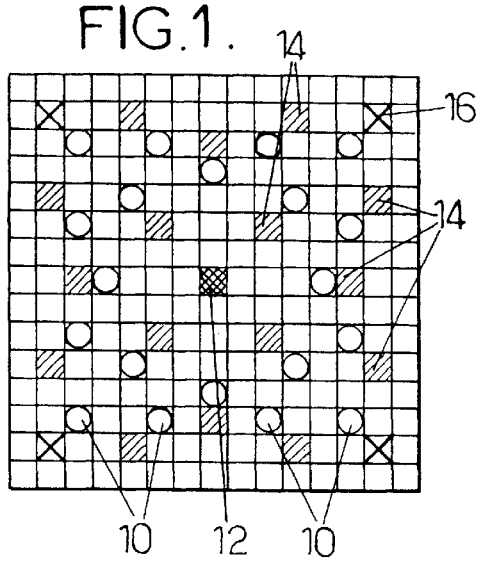
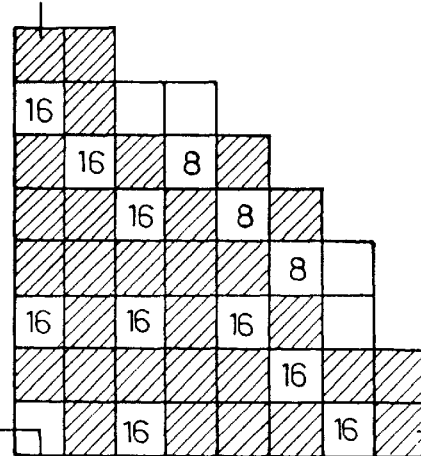
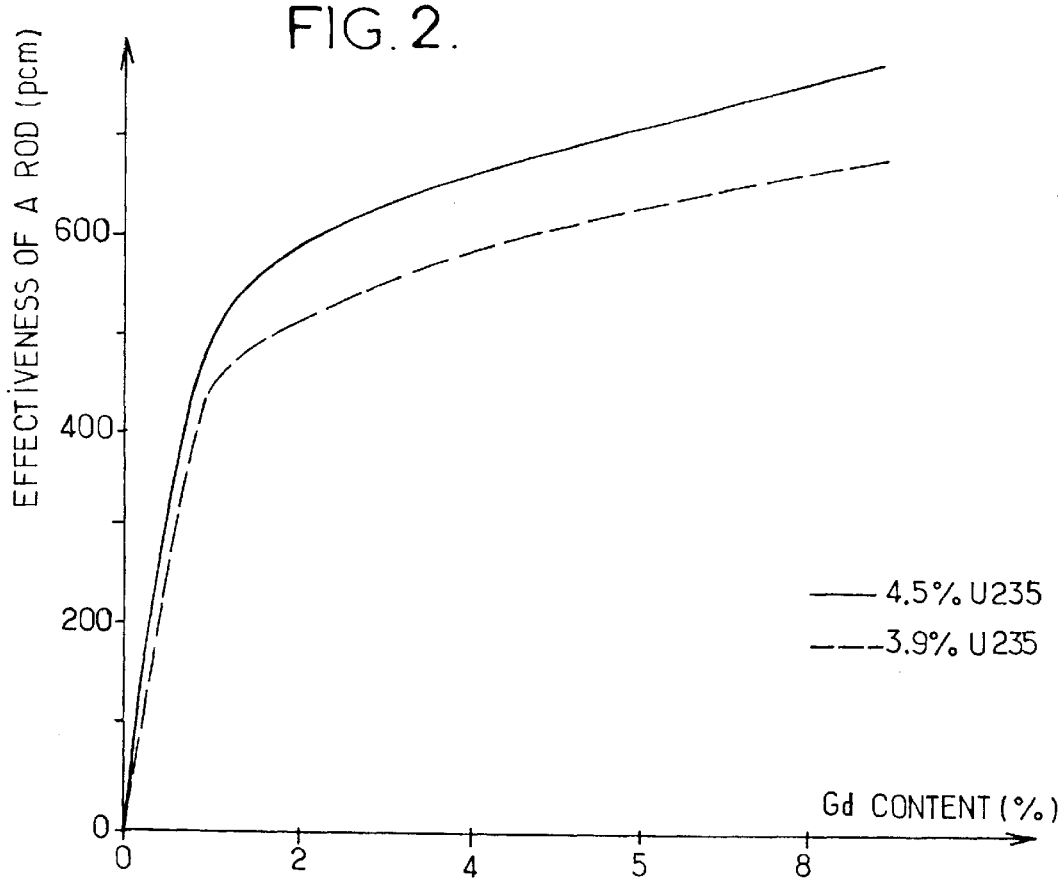

FUEL ASSEMBLY WITH CONSUMABLE POISON, AND A METHOD OF OPERATING A REACTOR

FIELD OF THE INVENTION

The invention relates to fuel assemblies for pressurized water nuclear reactors, and more particular by assemblies of the type comprising fuel rods distributed at the nodes of a square array, with at least most of the rods containing fuel material which, in most of the rods, is uranium oxide enriched in isotope 235 and/or in plutonium; the rods are generally carried by a skeleton having two endpieces interconnected by guide tubes and by rod-holding grids.

BACKGROUND OF THE INVENTION

Assemblies of this type are already known in which some (generally less than one in ten) of the fuel rods contain a neutron poison constituted by gadolinium at a mass concentration in the range of 5% to 12%. The gadolinium performs two functions. Because it absorbs neutrons, it serves to reduce the initial reactivity of the core after partial or total reloading with new fuel assemblies. The progressive disappearance of the gadolinium serves to compensate for the progressive using up of the fuel. By an appropriate distribution of fuel assemblies, containing gadolinium in the core, it is possible to achieve a more uniform radial distribution of power, and to do this throughout an operating cycle of the core prior to reloading.

The use of such assemblies in which rods that contain gadolinium all have the same concentration, does indeed have a favorable effect from the point of view of reducing reactivity at the beginning of each cycle, with a corresponding reduction in the concentration of boron that is required in the water, and with good radial neutron flux distribution. However, it is not possible to achieve satisfactory core management when it is designed to extend the duration of each core utilization cycle to periods of 18 months to 24 months, and/or when it is necessary to limit radial neutron leakage for better utilization of the fuel.

SUMMARY OF THE INVENTION

The present invention seeks in particular to provide a fuel assembly that makes more favorable core management possible, in which initial reactivity is high.

The invention makes use of the observation that the initial anti-reactivity (i.e., in a new rod) provided by the gadolinium present in the rod is not proportional to the concentration thereof, but increases much more slowly once that concentration exceeds about 1%.

Consequently, the invention proposes an assembly of the above-defined type in which the rods comprise, in addition to rods having a mass concentration of gadolinium lying in the range about 5% to about 10%, four to twelve rods having a gadolinium concentration in the range of 0.5% to 2%, and advantageously about 1%.

The anti-reactivity of the rods having low gadolinium concentration decreases much more quickly, starting from the beginning of the reactor cycle, than does the reactivity of rods having a considerably greater concentration. Thus, the rods having a low gadolinium content compensate for the initial high excess reactivity and provide extra margin on the moderator coefficient without thereby having an unfavorable effect on radial power distribution within a cycle.

It may be considered that the invention makes it possible to act independently on the two functions of the gadolinium: reducing initial reactivity, and controlling radial flux distribution. With a single concentration, the first function can be provided in a long cycle only with a high number of rods having 10% to 12% gadolinium, and that would deteriorate control of power distribution, in particular towards the end of a cycle as the gadolinium progressively disappears.

BRIEF DESCRIPTION OF THE DRAWINGS

The above characteristics, and others, appear more clearly on reading the following description of particular embodiments of the invention, given by way of example and with reference to the accompanying drawings, in which:

FIG. 1 is a schematic plan view showing the distribution of fuel rods in a first assembly of the invention;

FIG. 2 shows the variation of the anti-reactivity of a rod as a function of its Gd content, in two assemblies respectively containing oxide fuel enriched in uranium 235 to 4.50% (solid line curve) and to 3.90% (dashed line curve);

FIG. 3 is a diagram showing one possible distribution for assemblies in one-fourth of a nuclear reactor core, depending on the way in which the assemblies are implemented;

DESCRIPTION OF PREFERRED EMBODIMENT

Figure 4:
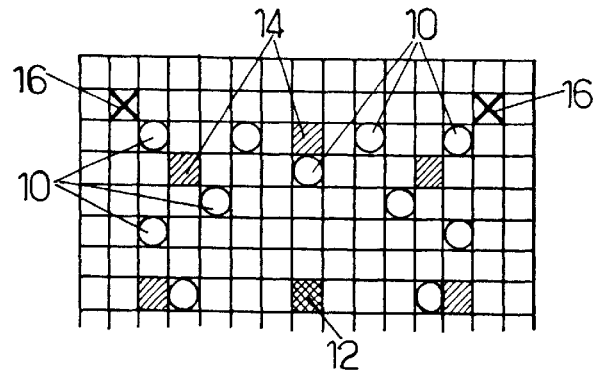
FIG. 4 is similar to FIG. 1 and shows a second distribution for eight rods having high gadolinium content.

The complete structure of an assembly to which the invention applies is not described herein since it may be conventional. FIG. 1 merely shows 15×15 locations occupied by fuel rods and guide tubes such as 10 in an assembly of the kind commonly used at present. The central location 12 is occupied by an instrumentation tube. The other locations are occupied by fuel rods.

Assemblies are already known in which sixteen rods 14 represented by shading in FIG. 1, have an initial gadolinium oxide content of 10% by weight. This content is not limiting. In other reactors, it is possible to use a lower content, e.g., in the range of 5% to 10%. It is also possible to use a content slightly in excess of 10%, and to go up as far as 12%. Depending on the reactor, the rods containing gadolinium contain either uranium that is enriched in U235 or in plutonium, with enrichment being equal to less than that of adjacent rods, or natural uranium, or even depleted uranium. In other cases, four to twelve rods 14, or twenty rods 14 are provided.

In prior art assemblies, all of the rods containing a consumable poison have the same gadolinium content. These rods are distributed uniformly.

In the assembly of the invention shown in FIG. 1, four rods 16 marked by crosses contain a low initial content of gadolinium. These rods 16 are disposed near the corners of the assembly, e.g., occupying the next to last location on each diagonal, when the rods 14 are distributed in the manner described above. It is possible to choose the same uranium medium as for the rods having 10% gadolinium.

FIG. 2 shows that the initial anti-reactivity effects provided by a rod 14 and by a rod 16 are not proportional to the gadolinium contents thereof. For example, in FIG. 2 it can be seen that for an assembly comprising rods initially enriched to 4.50% (ratio of U 235/(U 238+U 235)), the anti-reactivity provided by the 1% gadolinium is a little greater than 500 pcm (parts per hundred thousand), whereas the anti-reactivity provided by 8% gadolinium is no more than about 750 pcm. As a result, reducing the initial gadolinium content in a ratio of 8 to 1 gives rise to a reduction in anti-reactivity in a ratio of only about 1.47 to 1.

Still by way of example, FIG. 3 shows one possible distribution of fuel assemblies after one-third of the assemblies have been replaced by new assemblies. The shaded locations are occupied by assemblies that have already been used once or twice in the reactor.

Assemblies occupying the locations that have no marking have no gadolinium. The others contain four rods containing gadolinium at the second concentration, i.e., about 1%. They also contain sixteen rods having 10% gadolinium, of the kind shown in FIG. 1, or only eight rods containing 10% of gadolinium at the first concentration, in the arrangement shown in FIG. 4 where elements corresponding to those of the arrangement in FIG. 1 are given the same reference numerals.

As mentioned above, the fuel of the rods containing gadolinium may have various compositions. Nevertheless, it generally appears preferable for rods containing gadolinium at the second concentration to adopt a level of enrichment that is close to that of the adjacent rods having no gadolinium.

Figure 5:
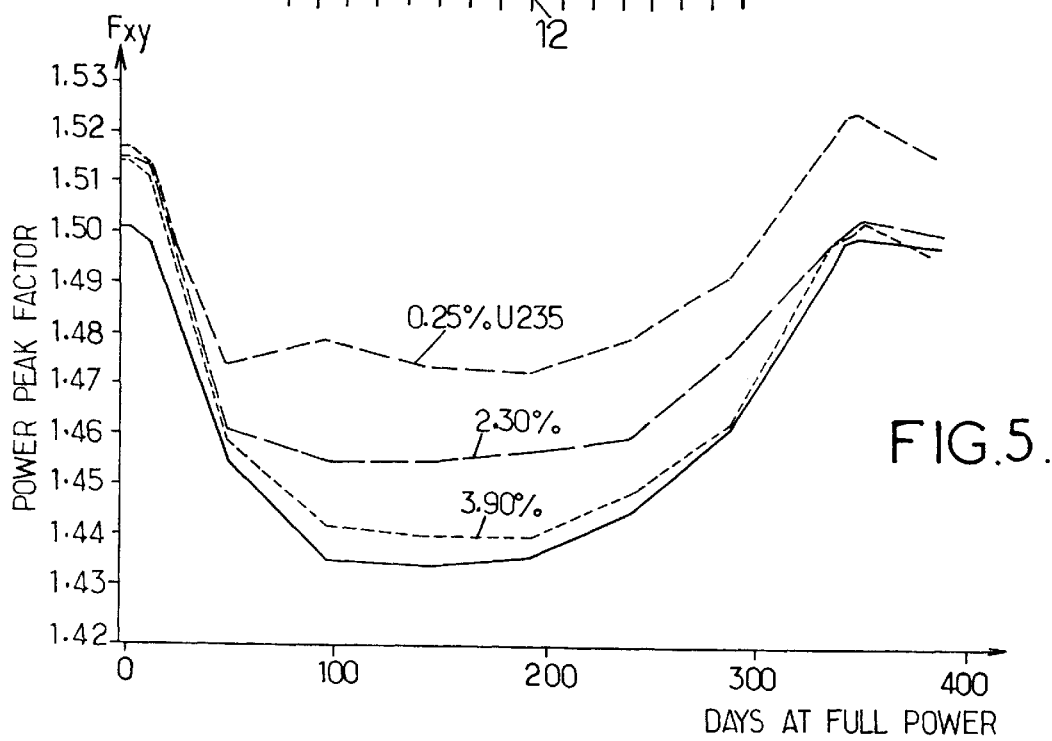
FIGS. 5 and 6 show how the peak power factor varies over time.

This result appears particularly on comparing the results obtained with various concentrations of U235 in the fuel. In particular, tests have been performed with assemblies having sixteen rods with 10% Gd and four rods with 1% Gd, the number of assemblies being such that there are one hundred and twelve rods with 1% Gd in all. FIG. 5 shows the results obtained with 1% Gd rods and with fuel comprising uranium oxide depleted to 0.25% uranium 235, uranium oxide enriched to 2.30% uranium 235, and uranium enriched to 3.90% uranium 235 (i.e., enriched to the same extent as the adjacent un-poisoned rods). The advantage of using the same degree of enrichment for all of the rods can be seen, in that there is little degradation of the radial peak power factor Fxy relative to management of the prior art type, and cycle duration is of the order of 350 fped (full power equivalent days).

Other tests have shown that in all cases the initial concentration of boron can be reduced considerably.

Figure 6:
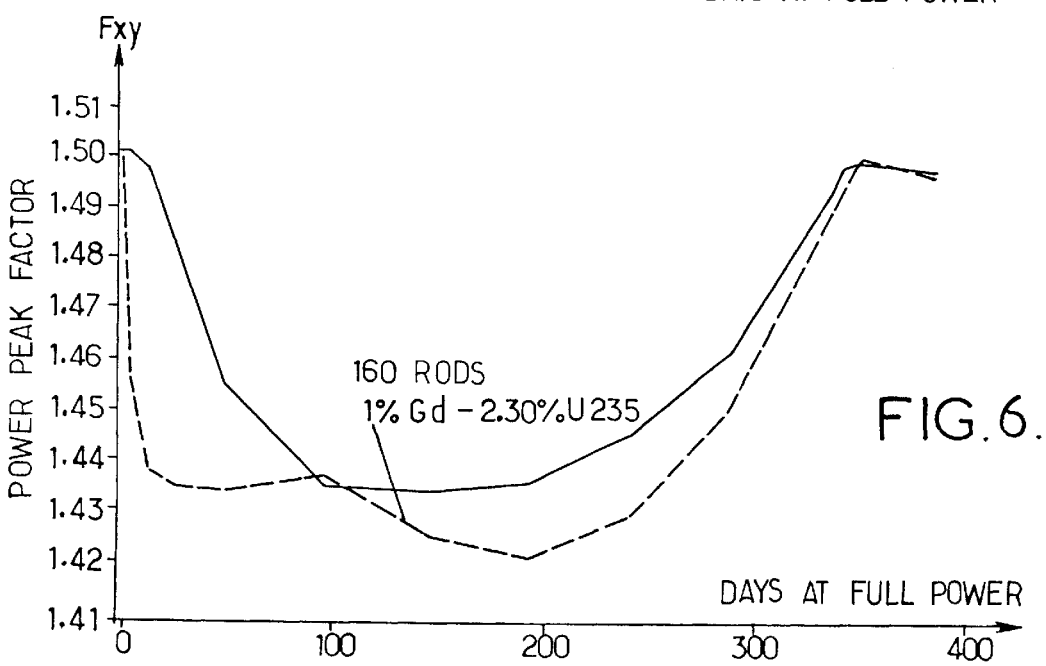

The result may be further improved by also adding four rods having 1% Gd to assemblies that contain only eight rods at 10% Gd, the total number of rods containing 1% Gd then being one hundred and sixty for the core as a whole. FIG. 6 shows how the radial peak factor Fxy varies as a function of exhaustion in reference conditions and for a core having one hundred and sixty rods with 1% Gd on fuel enriched to 2.30% U 235.

In this case, compared with reference management, the difference in initial boron concentration may be as much as −103 pcm, and there may also be a reduction in the moderator temperature coefficient of 1.7 pcm/°C.

Numerous other embodiments are possible. The assembly may be of any known type, having an array in which the number of nodes varies over 14×14 to 20×20. Rods containing gadolinium at the second concentration may be disposed in any one of numerous dispositions that are circularly symmetrical to order 4. In particular, rods containing gadolinium at the second concentration may be placed in the edge row; rods may be located at nodes adjacent to the location of a guide tube or of an instrumentation tube. If no central instrumentation tube is provided, then a rod containing gadolinium at the second concentration may be placed at the center of the assembly.

We claim:

1. A fuel assembly for a pressurized water reactor, the assembly comprising rods distributed at the nodes of a square array and containing a fuel material, some of said rods having a first concentration of gadolinium lying in the range 5% to 10% by weight, wherein four to twelve rods other than said some of the rods have a second concentration of gadolinium lying in the range 0.5% to 2% by weight.

2. An assembly according to claim 1, wherein the fuel of the rods containing gadolinium at a second concentration is constituted by uranium oxide enriched in U 235 to an extent that is less than or equal to that of those of the rods in the fuel assembly that do not contain gadolinium.

3. An assembly according to claim 1, wherein the fuel of rods containing gadolinium at the first concentration is constituted by natural uranium oxide that is depleted or enriched in uranium 235.

4. An assembly according to claim 1, wherein the rods containing gadolinium at the first concentration are four to twenty in number.

5. An assembly according to claim 1, wherein the rods containing gadolinium at the second concentration are distributed in the edge row with circular symmetry of order 4.

6. An assembly according to claim 1, wherein the rods containing gadolinium at the second concentration are distributed with circular symmetry of order 4 at the nodes of the array adjacent to the nodes occupied by guide tubes or by a central instrumentation tube.

7. An assembly according to of claim 1, having no central instrumentation tube, wherein a rod containing gadolinium at the second concentration is placed at the center of the assembly.

8. An assembly according to claim 1, wherein said rods having gadolinium at a second concentration include four rods having a gadolinium content of 1% situated at locations on diagonals on the array in the last row before a peripheral row of said array.

9. A fuel assembly for a pressurized water reactor, comprising a plurality of fuel rods distributed at the nodes of a 15×15 square array, each of said rods having a sheath and containing fuel material, wherein four to twenty of said fuel rods have a first concentration of gadolinium lying in the range 5% to 12% by weight, and wherein four to twelve other ones of said fuel rods have a second concentration of gadolinium lying in the range 0.5% to 2% by weight and are regularly distributed in a peripheral row of said array.

10. A core of a pressurized water reactor comprising a plurality of fuel assemblies distributed in a square array, each of said fuel assemblies comprising a plurality of fuel rods distributed at the nodes of the square array, some of said fuel assemblies containing partially burnt-up fuel and remaining ones of said fuel assemblies being new fuel assemblies;

wherein first ones of said new fuel assemblies are devoid of gadolinium;

second ones of said new fuel assemblies are located close to the periphery of the core and include eight fuel rods having a content of gadolinium in a range between 5 and 12% and four fuel rods having a content of gadolinium between 0.5 and 2%, the other fuel rods being devoid of gadolinium; and remaining ones of said new fuel assemblies include sixteen fuel rods having a concentration of gadolinium in a range of 5% to 12% by weight and four fuel rods having a concentration of gadolinium in a range of 0.5 to 2% by weight, the other fuel rods being devoid of gadolinium.

* * * * *